United States Patent
Malkamaki et al.

(10) Patent No.: US 8,750,224 B2
(45) Date of Patent: Jun. 10, 2014

(54) PRECONFIGURED SHORT SCHEDULING REQUEST CYCLE

(75) Inventors: Esa Malkamaki, Espoo (FI); Juha S. Korhonen, Espoo (FI)

(73) Assignee: Nokia Corporation, Espoo (FI)

(*) Notice: Subject to any disclaimer, the term of this patent is extended or adjusted under 35 U.S.C. 154(b) by 450 days.

(21) Appl. No.: 13/245,285

(22) Filed: Sep. 26, 2011

(65) Prior Publication Data

US 2013/0081026 A1    Mar. 28, 2013

(51) Int. Cl.
*H04Q 7/00*    (2006.01)
(52) U.S. Cl.
USPC .......................................... 370/329; 370/338
(58) Field of Classification Search
None
See application file for complete search history.

(56) References Cited

U.S. PATENT DOCUMENTS

| | | | |
|---|---|---|---|
| 2008/0004058 A1* | 1/2008 | Jeong et al. | 455/517 |
| 2009/0290570 A1* | 11/2009 | Kishiyama et al. | 370/344 |
| 2011/0059745 A1* | 3/2011 | Yi et al. | 455/452.2 |
| 2013/0003678 A1* | 1/2013 | Quan et al. | 370/329 |
| 2013/0028221 A1* | 1/2013 | Seo et al. | 370/329 |

FOREIGN PATENT DOCUMENTS

| | | |
|---|---|---|
| EP | 2 170 008 A1 | 3/2010 |
| EP | 2 211 585 A1 | 7/2010 |
| WO | 2009/035301 A2 | 3/2009 |
| WO | 2011/095843 A1 | 8/2011 |
| WO | 2011/098136 A1 | 8/2011 |

OTHER PUBLICATIONS

International Search Report and Written Opinion application No. PCT/FI2012/050743 dated Nov. 21, 2012.

* cited by examiner

*Primary Examiner* — Duc C Ho
(74) *Attorney, Agent, or Firm* — Squire Sanders (US) LLP

(57) ABSTRACT

In communication systems, for example Long Term Evolution (LTE) of the 3rd Generation Partnership Project (3GPP), using two cycles (long and short) to configure uplink (UL) scheduling request (SR) resources, and various ways of configuring a short scheduling request cycle may be able to add flexibility for a network (NW) to configure scheduling request cycles, allowing balance between latency and resource reservation. A method, according to certain embodiments, can include detecting that there is data activity associated with a user equipment and activating a short scheduling request cycle upon the detecting the data.

14 Claims, 6 Drawing Sheets

PRECONFIGURED SHORT SCHEDULING REQUEST CYCLE

BACKGROUND

1. Field

In communication systems, for example Long Term Evolution (LTE) of the 3rd Generation Partnership Project (3GPP), various ways of configuring a short scheduling request (SR) cycle may be able to add flexibility for a network (NW) to configure scheduling request cycles.

2. Description of the Related Art

Release 8 (Rel-8) of Long Term Evolution (LTE) of the 3rd Generation Partnership Project (3GPP) provides two scheduling request (SR) mechanisms: dedicated periodic scheduling requests resource on a physical uplink control channel (PUCCH) configured by radio resource control (RRC) and signaling and a scheduling request sent via random access. The latter is only allowed (in Rel-8) if dedicated scheduling request resources are not configured or transmissions on the dedicated scheduling request resources fail repeatedly.

Background type traffic can be considered, for example, to be user equipment (UEs) that infrequently generate/receive small amounts of data. The interarrival time of such traffic can be in the order of several seconds or several 10 s of seconds and the amount of data to be sent can be in the order of 50-150 bytes.

Background traffic user equipment, therefore, may be allocated less frequent scheduling request resources on a physical uplink control channel. Long scheduling request cycles produce latency of uplink transmissions, as user equipment have to wait for the next scheduling request resources to indicate to an evolved Node B (eNB) that the user equipment has some data to transmit. The extra latency may have less impact at the beginning of a data session and more during a data session.

Discontinuous reception (DRX) in LTE is specified such that when a user equipment receives either downlink (DL) assignment or uplink (UL) grant on a physical downlink control channel (PDCCH), the user equipment (re)starts an inactivity timer during which the user equipment monitors the physical downlink control channel for further uplink or downlink allocations. Furthermore, after the inactivity timer expires, the user equipment uses a short discontinuous reception cycle (if configured) for a given time (discontinuous reception short cycle timer) before entering a long discontinuous reception cycle again. Thus, downlink physical downlink control channel monitoring adapts to data transmission activity.

The same is not true for periodic scheduling requests. Periodic scheduling requests are simply configured by radio resource control signaling to a (semi-)static value, which can only be changed via radio resource control reconfiguration.

The extra latency for uplink can have an impact when some data is sent in the downlink direction, which should be acknowledged in the uplink direction (for example, transmission control protocol (TCP) acknowledgment (ACK)). Delay of acknowledgment can reduce the data rate in the downlink.

To summarize, currently discontinuous reception (for downlink physical downlink control channel monitoring) adapts with data activity (long and short discontinuous reception cycles and inactivity timer) but uplink scheduling requests can only be "adapted" via radio resource control signaling.

More particularly, periodic scheduling request resources can conventionally be configured via radio resource control signaling either for small latency (for example, scheduling request resource every 5 ms) or for less resource consumption (for example, scheduling request resource every 80 ms). Alternatively, a random access (RA) based approach can be used (if periodic scheduling request resources are not configured). Random access, however, can increase load and thus collisions on the random access channel (RACH).

Thus, conventionally, an uplink scheduling request cycle can only be adapted using radio resource control signaling. This approach, however, can either lead to increased latency and/or use of extra resources for, for example, background type traffic.

SUMMARY

According to certain embodiments, a method includes detecting that there is data activity associated with a user equipment. The method also includes activating a short scheduling request cycle upon the detecting the data.

A method according to certain embodiments includes scheduling a long scheduling request cycle for a user equipment. The method also includes scheduling a short scheduling request cycle upon receiving a request regarding the user equipment.

In certain embodiments, a method includes receiving a message for configuring scheduling request resources. The method also includes activating a configured scheduling request resource in response to another reception separate from the configuring message.

A method includes configuring scheduling request resources in certain embodiments. The method also includes activating a configured scheduling request resource.

An apparatus includes at least one processor and at least one memory including computer instructions in certain embodiments. The at least one memory and the computer instructions are configured to, with the at least one processor, cause the apparatus at least to detect that there is data activity associated with a user equipment. The at least one memory and the computer instructions are also configured to, with the at least one processor, cause the apparatus at least to activate a short scheduling request cycle upon detection of the data.

An apparatus includes, in certain embodiments, at least one processor and at least one memory including computer instructions. The at least one memory and the computer instructions are configured to, with the at least one processor, cause the apparatus at least to schedule a long scheduling request cycle for a user equipment. The at least one memory and the computer instructions are also configured to, with the at least one processor, cause the apparatus at least to schedule a short scheduling request cycle upon receiving a request regarding the user equipment.

In certain embodiments, an apparatus includes at least one processor and at least one memory including computer instructions. The at least one memory and the computer instructions are configured to, with the at least one processor, cause the apparatus at least to receive a message for configuring scheduling request resources. The at least one memory and the computer instructions are configured to, with the at least one processor, cause the apparatus at least to activate a configured scheduling request resource in response to another reception separate from the configuring message.

An apparatus includes at least one processor and at least one memory including computer instructions in certain embodiments. The at least one memory and the computer instructions are configured to, with the at least one processor, cause the apparatus at least to configure scheduling request resources. The at least one memory and the computer instructions are configured to, with the at least one processor, cause the apparatus at least to activate a configured scheduling request resource.

In certain embodiments, a non-transitory computer readable medium is encoded with instructions that, when executed in hardware, perform a process. The process includes detecting that there is data activity associated with a user equipment. The process also includes activating a short scheduling request cycle upon the detecting the data.

A non-transitory computer readable medium, in certain embodiments, is encoded with instructions that, when executed in hardware, perform a process. The process includes scheduling a long scheduling request cycle for a user equipment. The process also includes scheduling a short scheduling request cycle upon receiving a request regarding the user equipment.

In certain embodiments, a non-transitory computer readable medium is encoded with instructions that, when executed in hardware, perform a process. The process includes receiving a message for configuring scheduling request resources. The process also includes activating a configured scheduling request resource in response to another reception separate from the configuring message.

A non-transitory computer readable medium, in certain embodiments, is encoded with instructions that, when executed in hardware, perform a process. The process includes configuring scheduling request resources. The process also includes activating a configured scheduling request resource.

An apparatus, in certain embodiments, includes detection means for detecting that there is data activity associated with a user equipment. The apparatus also includes activation means for activating a short scheduling request cycle upon the detecting the data.

In certain embodiments, an apparatus includes scheduling means for scheduling a long scheduling request cycle for a user equipment. The apparatus also includes scheduling means for scheduling a short scheduling request cycle upon receiving a request regarding the user equipment.

According to certain embodiments, an apparatus includes receiving means for receiving a message for configuring scheduling request resources. The apparatus also includes activating means for activating a configured scheduling request resource in response to another reception separate from the configuring message.

An apparatus includes configuring means for configuring scheduling request resources in certain embodiments. The apparatus also includes activating means for activating a configured scheduling request resource.

BRIEF DESCRIPTION OF THE DRAWINGS

For proper understanding of the invention, reference should be made to the accompanying drawings, wherein.

DETAILED DESCRIPTION

Figure 1:
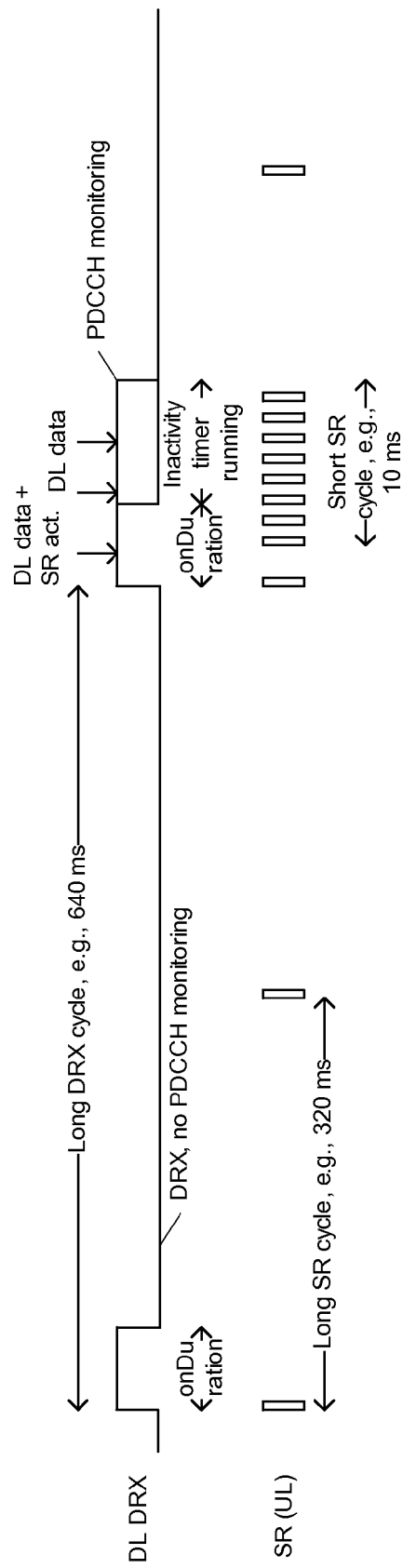
FIG. 1 illustrates a timing diagram according to certain embodiments.

Certain embodiments can keep several background traffic user equipment in connected mode without consuming excessive network resources, especially physical uplink control channel (PUCCH) resources.

Scheduling request (SR) resources can be configured to be available periodically, for example, from every subframe to once per 80 ms. For background traffic, an even longer scheduling request cycle may be acceptable, especially if the user equipment is in long discontinuous reception (DRX). A discontinuous reception cycle can be up to, for example, 2.5 s.

Certain embodiments use periodic scheduling request resources with a long and short scheduling request cycle. The long scheduling request cycle can be configured by radio resource control (RRC) signaling. The short scheduling request cycle can be pre-configured by radio resource control signaling. The short scheduling request cycle can then be dynamically activated and deactivated. When activated, a short scheduling request cycle can be partly configured by radio resource control signaling and partly by media access control (MAC)/physical layer signaling.

More particularly, certain embodiments specify periodic scheduling request resource with long and short scheduling request cycles. A long scheduling request cycle can be configured or reconfigured by radio resource control signaling in the same way as a conventional scheduling request and could also be called a semi-static scheduling request resource.

In contrast, a short scheduling request cycle can be pre-configured by radio resource control signaling and it can be dynamically activated and deactivated in various ways. For example, dynamic activation or deactivation can be explicit, for example, by media access control or physical downlink control channel signaling. Alternatively, the dynamic activation or deactivation can be implicit, for example, following discontinuous reception timers. This implicit approach can be particularly applicable to deactivation. A further option is that long scheduling request cycle is not configured at all. In this case, if short scheduling request cycle is not active, UE sends scheduling requests via random access procedure. Then the short scheduling request cycle can also be activated after a scheduling request is received via random access.

Thus, activating a short scheduling request cycle can occur when there is data activity. For example, when some data is sent in the downlink and some uplink feedback is expected, such as a transmission control protocol acknowledgment.

Various implementations are possible. For example, long scheduling request cycles can be configured by radio resource control signaling in the same way as Rel-8/Rel-10 scheduling request cycles. For example, the following parameters can be given: sr-ConfigIndex, PUCCH-ResourceIndex (and sr-PUCCH-ResourceIndexP1), and dsr-TransMax. The parameter sr-ConfigIndex can indicate the periodicity and the subframe offset of scheduling request resources. The parameters sr-PUCCH-ResourceIndex and sr-PUCCH-ResourceIndexP1 can be used to derive an orthogonal sequence index as well as a cyclic shift. The parameter dsr-TransMax can give the maximum number of transmissions allowed for scheduling requests before going to random access.

Short scheduling request cycles can be partly configured by radio resource control signaling and partly configured by media access control/physical layer when activating a short scheduling request cycle.

There are several alternatives for the configuration depending on how much is configured by radio resource control signaling and how much is left for media access control/physical layer configuration. In certain embodiments, at a minimum, radio resource control can be used to configure short scheduling request feature on/off (this could also be a user equipment capability feature, such that, for example, the user equipment that indicates this capability can then have the capability activated with media access control/physical downlink control channel) and then all parameters can be given by media access control/physical layer (media access control (MAC) control element (CE) or physical downlink control channel). At the other extreme, RRC would configure short scheduling request cycles completely and media access control/physical layer would simply activate/deactivate the configured short scheduling request cycle (e.g., a new "short scheduling request activation media access control CE" or a special physical downlink control channel format).

In a certain embodiment, part of the parameters would be preconfigured by radio resource control and the rest would be configured by media access control/physical layer when activating a short scheduling request cycle.

For instance, radio resource control signaling can configure scheduling request periodicity, physical uplink control channel resource indices, and dsr-TransMax. For scheduling request periodicity, a value range can be, for example, 2, 5, 10, or 20 ms/subframes. The set of physical uplink control channel resource indices may be, for example, 4 or 8 values (or pairs of values if both antenna ports P0 and P1 are used). The physical uplink control channel resource index can have a value range of 0 to 2047. The parameter dsr-TransMax can be provided for short scheduling request cycles. If needed, the same value as for long scheduling request can be used here or a fixed value can be used.

If media access control level activation is used, then a media access control CE can be specified. The media access control CE can indicate which physical uplink control channel resource index from preconfigured ones to use (2 or 3 bits needed if 4 or 8 values preconfigured, respectively) as well as the subframe offset (5 bits would be enough for max periodicity of 20 subframes).

Alternatively, the subframe offset can be derived from the subframe where the media access control CE was sent/received (due to hybrid automatic repeat request (HARQ) retransmissions, this may not be known exactly). Instead of preconfiguring 4 or 8 values for physical uplink control channel resource index, the physical uplink control channel resource index (11 bits) can be signaled with the media access control CE.

If physical downlink control channel activation is used, then a physical downlink control channel (or downlink control information (DCI)) format can be specified. The timing of the physical downlink control channel can be used to determining the subframe offset (in the similar way as semi-persistent scheduling (SPS) activation physical downlink control channel determines the subframe offset for semi-persistent scheduling). For semi-persistent scheduling, a different RNTI, namely "SPS C-RNTI" can be used to distinguish SPS activation physical downlink control channel from normal physical downlink control channel.

In one embodiment, a new RNTI for short scheduling request cycle activation is provided. Then, the contents of the physical downlink control channel can be freely redesigned. Alternatively, the same approach as for physical downlink control channel order can be used here: use Format 1A, set localized/distributed bit to '1' and set all resource block assignment bits to '1', then the rest of the bits can be set freely.

The next 2 or 3 bits can be defined to indicate which 'command' is sent (they can be set to all '0' in this case) and then 2 or 3 bits can be used to indicate one of the 4 or 8 preconfigured physical uplink control channel resource indices.

Alternatively, 11 bits can be allocated to indicate (directly) the physical uplink control channel resource index, which may have a value range of from 0 to 2047). In this case, the periodicity alone could be preconfigured by radio resource control signaling.

In one embodiment, radio resource control signaling is used for preconfiguring the scheduling request resources except for the subframe offset, and activating the short cycle happens when the user equipment receives downlink resource assignment on the physical downlink control channel. The subframe offset of the short cycle resource is derived from the subframe of the assignment. Even in this case, there could be an indication on PDCCH which tells whether the short scheduling request cycle is activated or not.

A typical use case for short scheduling request cycle could be when a user equipment receives downlink data. Then the eNB can first wait until the next discontinuous reception on duration to send physical downlink control channel and data on a physical downlink shared channel (PDSCH). Then eNB can send the short scheduling request cycle activation command (either as media access control CE together with downlink data or as a separate physical downlink control channel command) to the user equipment and after that the user equipment would use short scheduling request cycle. Thus the user equipment would be able to request uplink grant faster than with long scheduling request cycle.

Another use case of short scheduling request cycle is to allow rapid adjustment according to variations in the number of active UEs. At one moment the number of connected mode UEs may be so low that network may be able to activate short cycles for many UEs. This would be reasonable even without data transmissions because delays that UEs experience when initiating UL transmissions would be on the average shorter than with only long cycles. At a later moment the number of connected mode UEs could become larger, and the network could deactivate some of the short cycles in order to be prepared for providing them for UEs with data reception.

FIG. 1 illustrates a timing diagram according to certain embodiments. In FIG. 1, the upper part of the figure shows downlink monitoring activity of the physical downlink control channel. The lower part of FIG. 1 shows scheduling request resources allocated to the user equipment. When the user equipment is in long discontinuous reception and only monitoring physical downlink control channel during the onDuration time, then the scheduling request cycle can be long, for example, 320 ms (although it can still be considered long while being shorter, such as 80 ms). When data activity in downlink starts, an evolved Node B (eNB) can also activate a pre-configured short scheduling request cycle in UL (for example, by a "short scheduling request media access control (MAC) control element (CE)" or by physical downlink control channel command). This can enable faster scheduling requests in uplink when there is downlink data which may require feedback (for example, TCP ACK). When downlink data ends and the discontinuous reception inactivity timer expires and the user equipment again enters long discontinuous reception, also the short scheduling request deactivates (implicitly). Alternatively, eNB can send, e.g., physical downlink control channel command to explicitly deactivate the short scheduling request cycle. The user equipment then returns to use the configured long scheduling request cycle. Instead of having either long or short scheduling request cycle active at a time, it can be beneficial to keep the long cycle active also when the short cycle is active. Thus, there is no requirement that the long scheduling request cycle be deactivated before or when the short scheduling request is activated.

Certain embodiments allow configuring long scheduling request cycles for user equipment with only background traffic, without sacrificing the uplink latency when there is more delay critical data to be sent. This may save scheduling request resources and allow more user equipment to be kept in connected mode.

Figure 2:
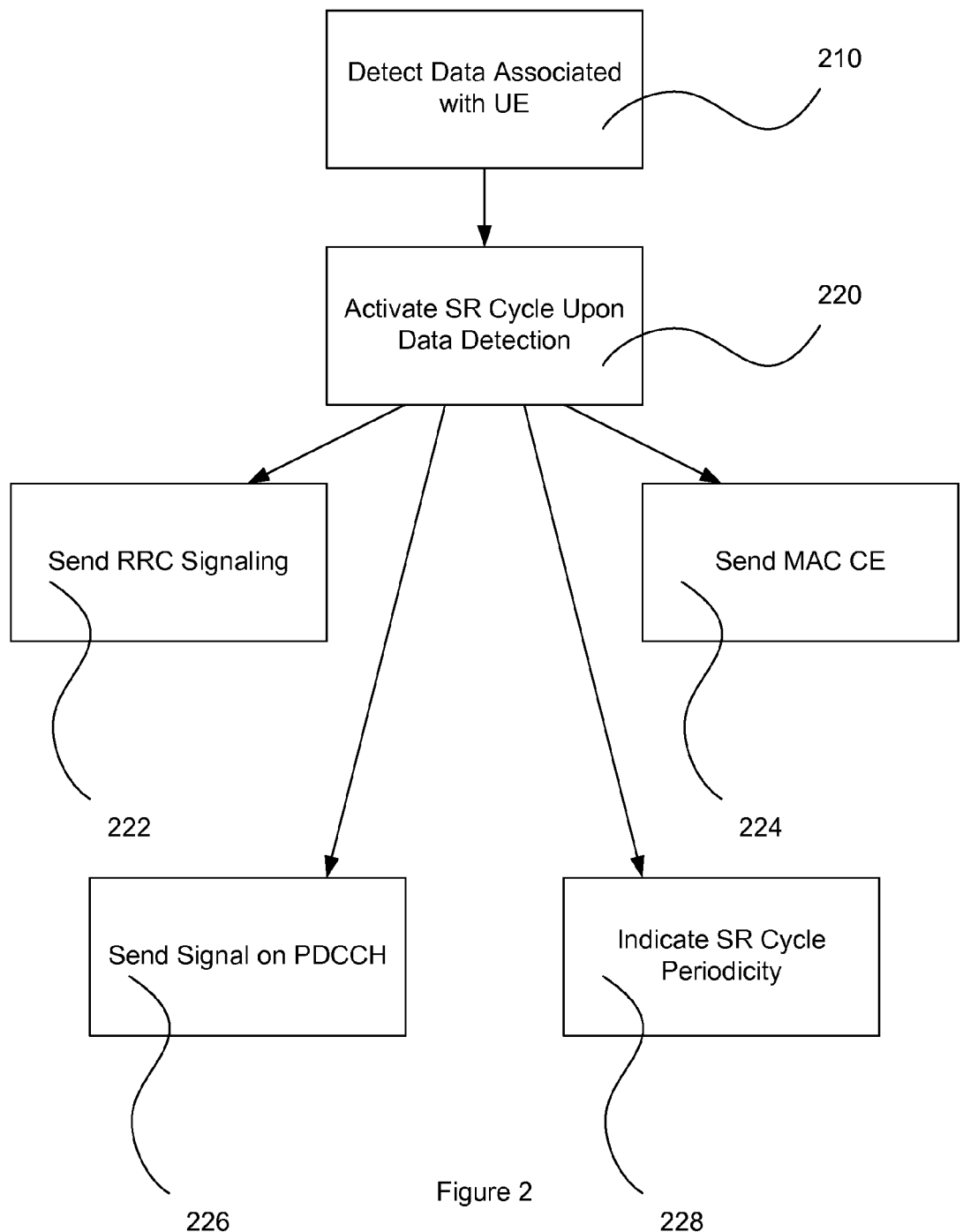
FIG. 2 illustrates a method according to certain embodiments.

FIG. 2 illustrates a method according to certain embodiments. The method of FIG. 2 can be performed by a device such as, for example, an evolved Node B (eNodeB). As shown in FIG. 2, a method can include, at 210, detecting that there is data activity associated with a user equipment (UE). This detection can be performed by a device that is actually sending the data to the user equipment. In an alternative embodiment, the device that detects is not the device that sends data. The detecting can be performed when the user equipment is in a long scheduling request cycle. A further detection can be performed to make a determination as to whether to continue or extend a short scheduling request cycle. The detecting can include detecting data in a downlink for which uplink feedback is expected, such as a transmission control protocol (TCP) acknowledgement (ACK) message.

The method can also include, at 220, activating a short scheduling request (SR) cycle upon the detecting the data. This activation can be done through explicit signaling. Alternatively, this activation can be performed by sending the data to the user equipment. In the latter case, the user equipment may be preconfigured to interpret the data as an activation of a short scheduling request cycle. Sending an explicit activation message may permit the configuration of various parameters. This process is referred to as "activation," although it may actually require a user equipment to engage in monitoring and consequently "activation" in a different sense can take place at the user equipment.

The activating the short scheduling request cycle can include, at 222, sending radio resource control (RRC) signaling. Also or alternatively, the activating the short scheduling request cycle can include, at 224, sending a media access control (MAC) control element (CE). As a further option or alternative, the activating the short scheduling request cycle can include, at 226, sending signaling on a physical downlink control channel (PDCCH). Also, the activating the short scheduling request cycle can include, at 228, sending a request including indication of desired periodicity.

Figure 3:
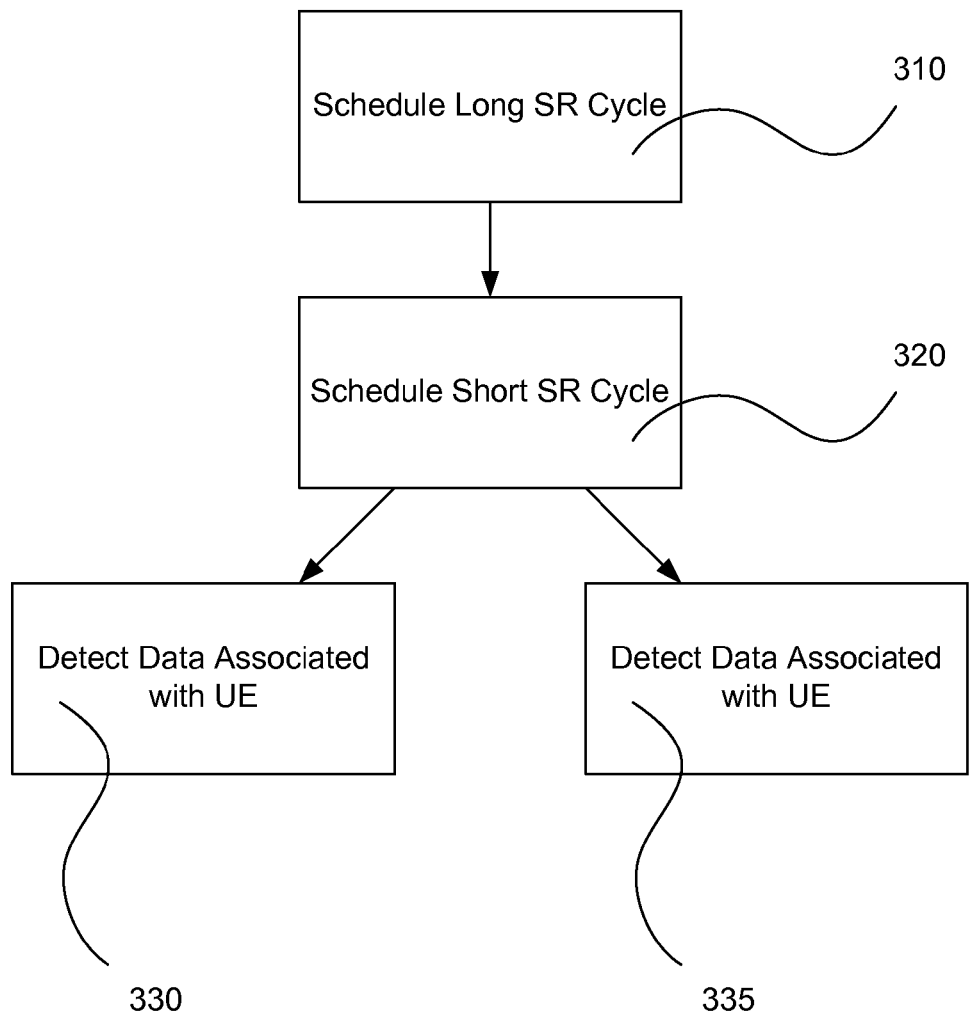
FIG. 3 illustrates another method according to certain embodiments.

FIG. 3 illustrates another method according to certain embodiments. The method of FIG. 3 can be performed by a device such as a user equipment, although other devices can be configured to perform the illustrated method. As shown in FIG. 3, a method can include, at 310, scheduling a long scheduling request (SR) cycle for a user equipment. The method can also include, at 320, scheduling a short scheduling request cycle upon receiving a request regarding the user equipment. These schedulings can refer to the scheduling of monitoring by the user equipment. The actual schedule may be determined by a base station or other network element.

The method can further include, at 330, deactivating the short scheduling request cycle upon the expiration of discontinuous reception (DRX) timer. Alternatively, the method can include, at 335, deactivating the short scheduling request cycle upon an explicit request. Alternatively, a separate scheduling request resource deactivation timer can be specified. The timer can be started when the short cycle is activated and it can be restarted when receiving or transmitting data or when receiving activation signaling while the timer is still running. The short cycle can be deactivated when the timer expires.

Figure 4:
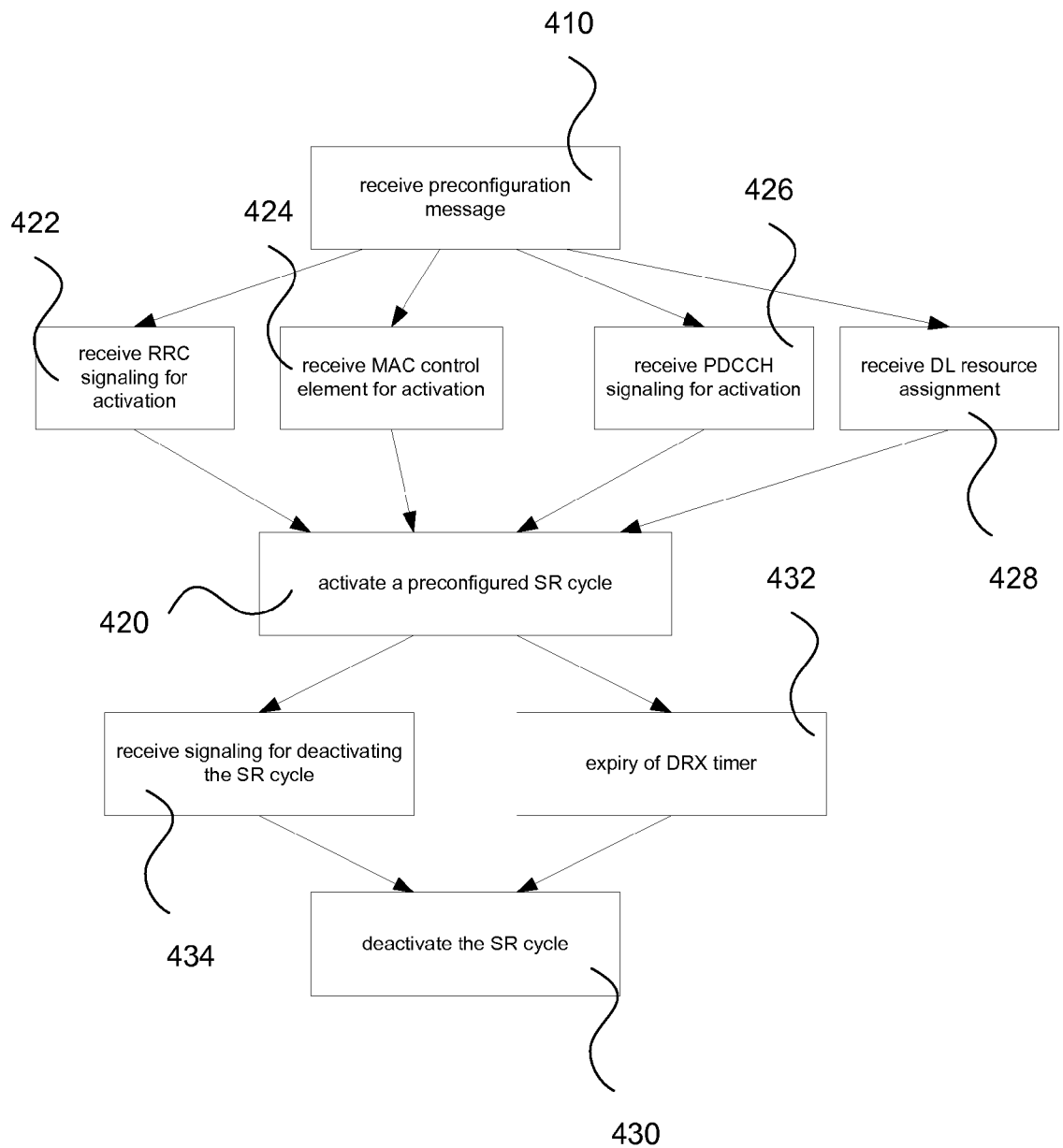
FIG. 4 illustrates a method according to certain embodiments.

FIG. 4 illustrates another method according to certain embodiments. As shown in FIG. 4, a method can include, at 410, receiving a message (such as a preconfiguration message) for configuring scheduling request resources (including a set of such resources). The preconfiguration message can include at least one of the following parameters: scheduling request cycle length or periodicity; (for example, a set of) physical uplink control channel resource indices (or even just one such index); or dsr-TransMax.

The method can also include, at 420, activating a configured (for example, preconfigured) scheduling request resource. The activating can include receiving at least one of a scheduling request cycle offset; a scheduling request cycle length or periodicity; (for example, a set of) physical uplink control channel resource indices (or even just one such index); or dsr-TransMax.

The activating can include receiving radio resource control signaling, at 422, or media access control (MAC) control element, at 424. The activating can also or alternatively include, at 424, receiving signaling on a physical downlink control channel. The signaling can be a downlink resource assignment and the subframe offset of the activated scheduling request resource can be derived from the subframe of the assignment. For example, the subframe offset of the scheduling request resource can be derived from the subframe of the physical downlink control channel.

Another scheduling request cycle can already be active when the preconfigured scheduling request cycle is activated. The other scheduling request cycle can be longer than the activated preconfigured scheduling request cycle.

The method can further include deactivating, at 430, the short scheduling request cycle upon the expiration of discontinuous reception timer, at 432, or a timer that was started when activating the scheduling request cycle, or upon an explicit request, at 434.

Figure 5:
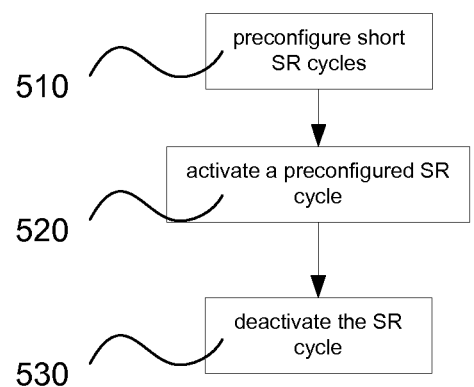
FIG. 5 illustrates another method according to certain embodiments.

FIG. 5 illustrates another method according to certain embodiments. As shown in FIG. 5, the method can include, at 510, preconfiguring scheduling request resources (this can also be referred to as configuring scheduling request resources). The method can also include, at 520, activating a preconfigured scheduling request resource (that is to say, a scheduling request configured previously, which can be referred to as a configured scheduling request resource). The method can further include, at 530, deactivating the scheduling request resource. The activating can be similar to the activating in the embodiments illustrated in FIG. 4.

Figure 6:
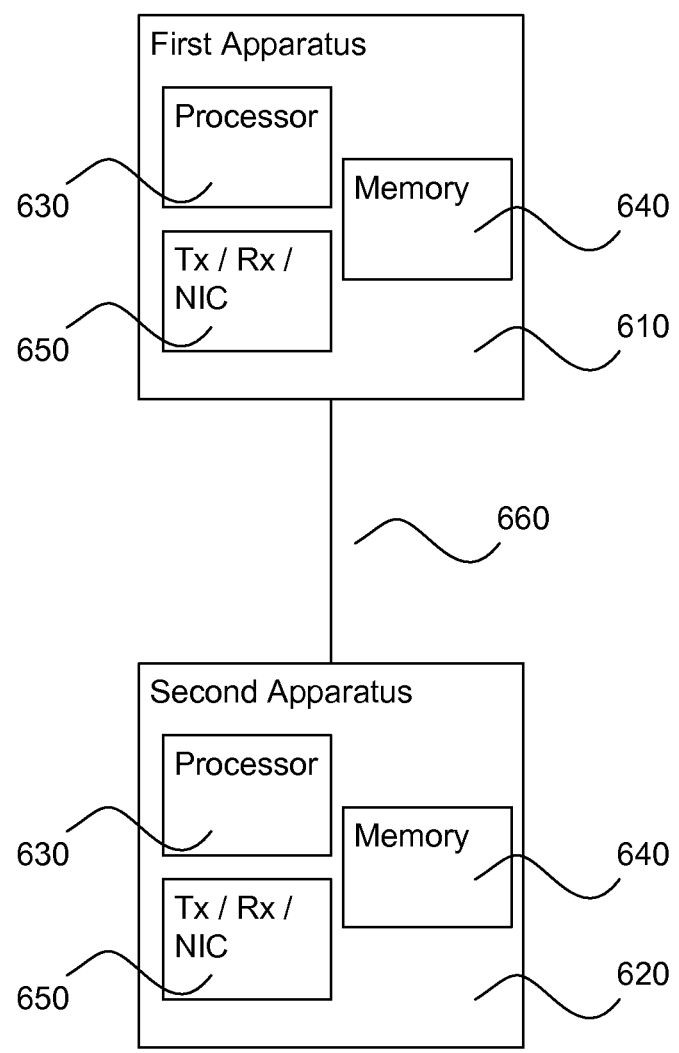
FIG. 6 illustrates a system according to certain embodiments of the present invention.

FIG. 6 illustrates a system according to certain embodiments of the present invention. As shown in FIG. 6, the system can include a first apparatus 610 (such as a user equipment) and second apparatus 620 (such as a base station, for example, an eNB). Each of the apparatuses may be equipped with at least one processor 630, at least one memory 640 (including computer program instructions), and transceiver/network interface card 650 (other communications equipment, such as an antenna, may also be included). The apparatuses may be configured to communicate with one another over an interface 660, which may be a wireless interface, but may incorporate both wireless and wired interfaces in various embodiments.

The at least one processor 630 can be variously embodied by any computational or data processing device, such as a central processing unit (CPU) or application specific integrated circuit (ASIC). The at least one processor 630 can be implemented as one or a plurality of controllers.

The at least one memory 640 can be any suitable storage device, such as a non-transitory computer-readable medium. For example, a hard disk drive (HDD) or random access memory (RAM) can be used in the at least one memory 640. The at least one memory 640 can be on a same chip as the at least one processor 630, or may be separate from the at least one processor 630.

The computer program instructions may be any suitable form of computer program code. For example, the computer program instructions may be a compiled or interpreted computer program.

The at least one memory 640 and computer program instructions can be configured to, with the at least one processor 630, cause a hardware apparatus (for example, a user equipment or base station) to perform a process, such as the processes shown in FIGS. 1-5 or any other process described herein.

Thus, in certain embodiments, a non-transitory computer-readable medium can be encoded with computer instructions that, when executed in hardware perform a process, such as one of the processes described above. Alternatively, certain embodiments of the present invention may be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
 receiving a message for configuring scheduling request resources; and
 activating a configured scheduling request resource in response to another reception separate from the configuring message,
 wherein the activating comprises receiving radio resource control signaling or media access control (MAC) control element or receiving signaling on a physical downlink control channel, and
 wherein a subframe offset of the scheduling request resource is derived from a subframe of the physical downlink control channel.

2. The method of claim 1, wherein the configuration message comprises at least one of parameters:
 scheduling request cycle length or periodicity;
 physical uplink control channel resource index or indices; or
 dsr-TransMax.

3. The method of claim 1, wherein the another reception is used to derive at least one of
 scheduling request cycle offset;
 scheduling request cycle length or periodicity;
 physical uplink control channel resource index; or
 dsr-TransMax.

4. The method of claim 1, wherein the configured scheduling request resource comprises a configured scheduling request cycle and wherein another scheduling request cycle is active when the configured scheduling request cycle is activated and the another scheduling request cycle is not shorter than the activated configured scheduling request cycle.

5. The method of claim 1, further comprising:
 deactivating the scheduling request resource upon the expiration of discontinuous reception timer or a timer that was started when activating the scheduling request resource.

6. The method of claim 1, further comprising:
 deactivating the scheduling request resource upon an explicit request.

7. A method, comprising:
 configuring scheduling request resources; and
 activating a configured scheduling request resource,
 wherein the activating comprises sending radio resource control signaling or media access control (MAC) control element or sending signaling on a physical downlink control channel, and
 wherein a subframe offset of the scheduling request resource is derived from a subframe of the physical downlink control channel.

8. The method of claim 7, wherein the configured scheduling request resources comprise a configured scheduling request cycle and wherein another scheduling request cycle is active when the configured scheduling request cycle is activated and the another scheduling request cycle is not shorter than the activated configured scheduling request cycle.

9. The method of claim 7, further comprising:
 deactivating the scheduling request resource by sending an explicit request.

10. An apparatus, comprising:
 at least one memory including computer program instructions; and
 at least one processor,
 wherein the at least one memory and computer program instructions are configured to, with the at least one processor, cause the apparatus at least to
 process a received message for configuring scheduling request resources; and
 activate a configured scheduling request resource in response to another reception separate from the received message,
 wherein the at least one memory and computer program instructions are configured to, with the at least one processor, cause the apparatus at least to activate by receiving radio resource control signaling or media access control (MAC) control element or receiving signaling on a physical downlink control channel, and
 wherein the at least one memory and computer program instructions are configured to, with the at least one processor, cause the apparatus at least to derive a subframe offset of the scheduling request resource from a subframe of the physical downlink control channel.

11. The apparatus of claim 10, wherein the received message comprises at least one of parameters:
 scheduling request cycle length or periodicity;
 physical uplink control channel resource index or indices; or
 dsr-TransMax.

12. The apparatus of claim 10, wherein the at least one memory and computer program instructions are configured to, with the at least one processor, cause the apparatus at least to use the another reception to derive at least one of
 scheduling request cycle offset;
 scheduling request cycle length or periodicity;
 physical uplink control channel resource index; or
 dsr-TransMax.

13. The apparatus of claim 10, wherein the configured scheduling request resource comprises a configured scheduling request cycle and wherein the at least one memory and computer program instructions are configured to, with the at least one processor, cause the apparatus at least to activate the configured scheduling request cycle when another scheduling request cycle is active and the another scheduling request cycle is not shorter than the activated configured scheduling request cycle.

14. The apparatus of claim 10, wherein the at least one memory and computer program instructions are configured to, with the at least one processor, cause the apparatus at least to deactivate the scheduling request resource upon an explicit request or upon the expiration of discontinuous reception timer or a timer that was started when activating the scheduling request resource.

* * * * *